United States Patent
Holzapfel

(10) Patent No.: US 7,471,397 B2
(45) Date of Patent: Dec. 30, 2008

(54) POSITION-MEASURING DEVICE

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 391 days.

(21) Appl. No.: 11/478,168

(22) Filed: Jun. 28, 2006

(65) Prior Publication Data

US 2007/0013920 A1    Jan. 18, 2007

(30) Foreign Application Priority Data

Jun. 28, 2005    (DE) .................... 10 2005 029 917

(51) Int. Cl.
G01B 9/02    (2006.01)
G01D 5/36    (2006.01)

(52) U.S. Cl. .................... 356/494; 356/521; 250/237 G

(58) Field of Classification Search ................ 356/488, 356/494, 499, 521; 250/231.14–231.18, 250/237 G
See application file for complete search history.

(56) References Cited

U.S. PATENT DOCUMENTS

| | | | |
|---|---|---|---|
| 5,079,418 A | | 1/1992 | Michel et al. |
| 5,977,539 A | * | 11/1999 | Holzapfel et al. ....... 250/237 G |
| 6,771,377 B2 | * | 8/2004 | Jones et al. ............. 250/237 G |
| 2003/0174343 A1 | * | 9/2003 | Masreliez et al. ........... 356/616 |
| 2003/0174344 A1 | * | 9/2003 | Jones et al. ................. 356/616 |
| 2004/0051881 A1 | * | 3/2004 | Holzapfel et al. ........... 356/616 |
| 2006/0139654 A1 | * | 6/2006 | Takahashi et al. ........... 356/494 |
| 2007/0013920 A1 | * | 1/2007 | Holzapfel .................... 356/616 |
| 2008/0067333 A1 | * | 3/2008 | Holzapfel et al. ........... 250/234 |

FOREIGN PATENT DOCUMENTS

| | | |
|---|---|---|
| EP | 0 387 520 | 5/1993 |
| EP | 1 347 271 | 9/2003 |
| WO | WO 02/23131 | 3/2002 |

* cited by examiner

*Primary Examiner*—Patrick J Connolly
(74) *Attorney, Agent, or Firm*—Kenyon & Kenyon LLP

(57) ABSTRACT

In a position-measuring device for recording the relative position of a scanning unit and a measuring graduation that is movable with respect to the latter in at least one measuring direction, the scanning unit includes a plurality of grating structures as well as at least one reflector element. The elements in the scanning unit are arranged such that the beams of rays diffracted by the measuring graduation pass through first grating structures in the scanning unit, subsequently impinge on the reflector element, from which there takes place a retroreflection in the direction of the measuring graduation, and the partial beams of rays then pass through second grating structures and then once again impinge upon the measuring graduation. The first and the second grating structures are arranged such that, upon the first and second passing through of the partial beams of rays, a defined lens effect on the partial beams of rays results.

21 Claims, 12 Drawing Sheets

FIG. 5
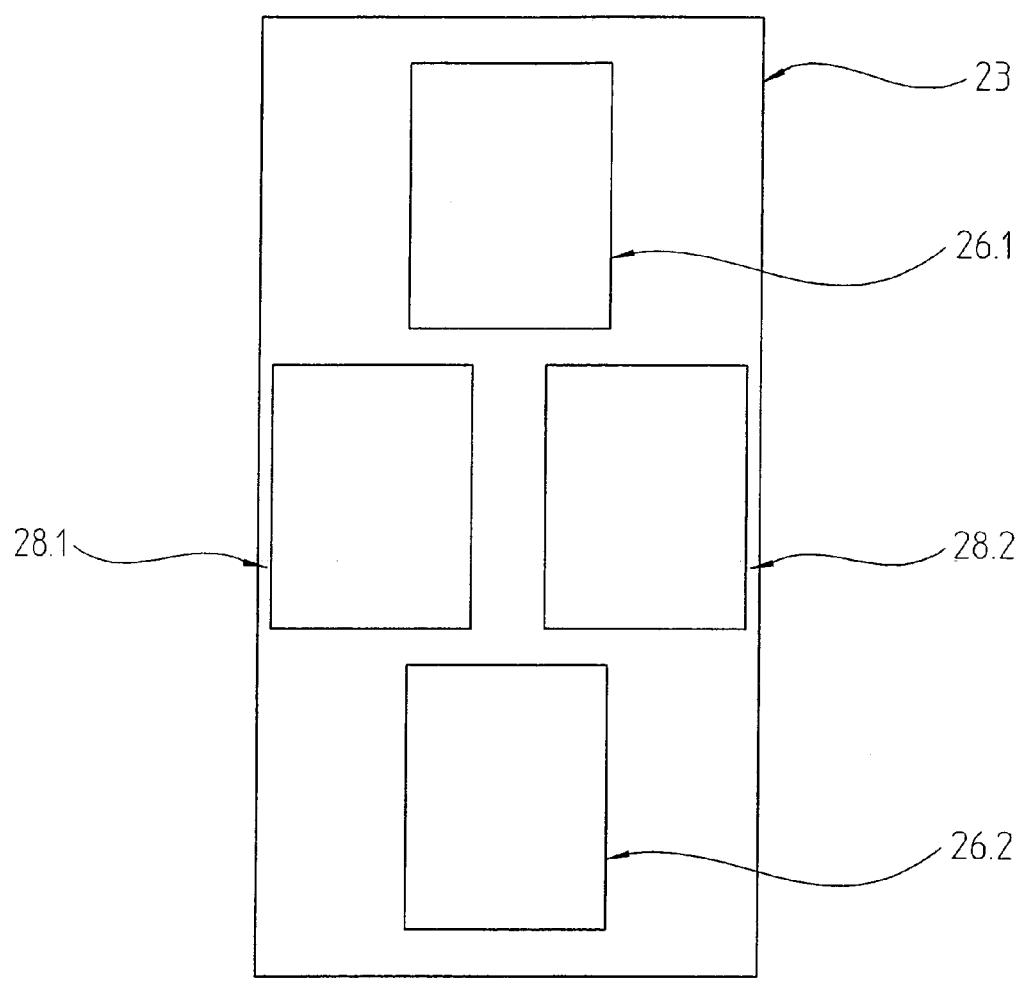
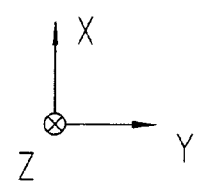

FIG. 9
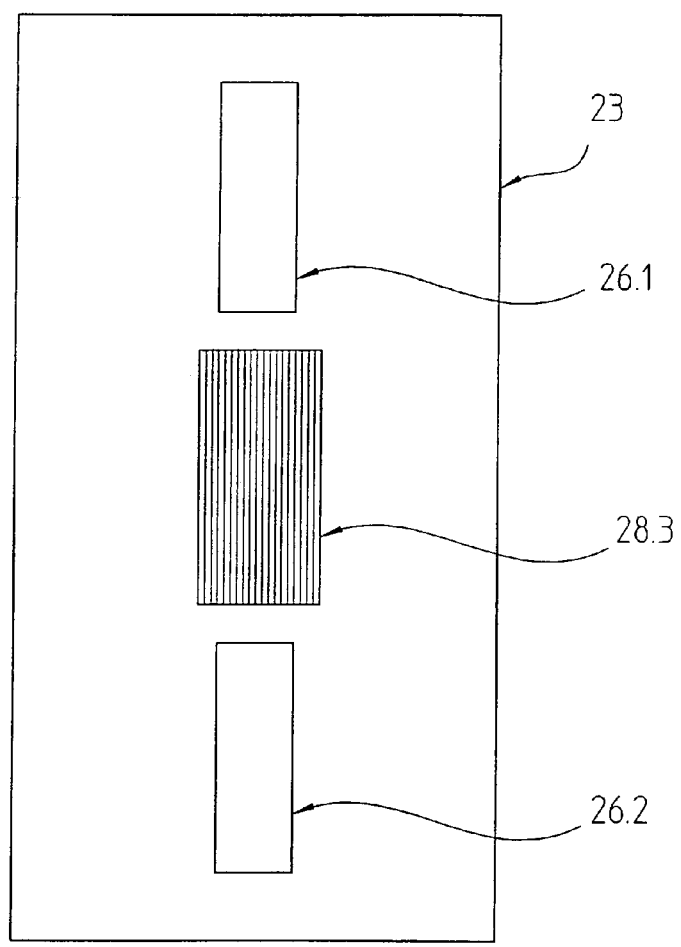
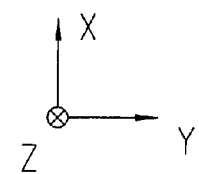

POSITION-MEASURING DEVICE

CROSS-REFERENCE TO RELATED APPLICATIONS

The present application claims priority to Application No. 10 2005 029 917.2, filed in the Federal Republic of Germany on Jun. 28, 2005, which is expressly incorporated herein in its entirety by reference thereto.

FIELD OF THE INVENTION

The present invention relates to a position-measuring device.

BACKGROUND INFORMATION

Position-measuring devices are described in PCT International Published Patent Application No. WO 02/23131, for example. Besides a measuring graduation, developed, for example, as a linear incident light scale, it includes a scanning unit that is displaceable with respect to it in at least one measuring direction. On the side of the scanning unit, besides a scanning grating, several optoelectronic detector elements, among other things, there is arranged also at least one optical reflector element in the form of a retroreflector. A back reflection takes place via the retroreflector of the partial beam of rays reflected in the first place by the measuring graduation, in the direction of the measuring graduation. There, the partial beam of rays is then subsequently reflected a second time, before finally interfering partial beams of rays reach the detectors, and in that place generate scanning signals that are modulated as a function of displacement. In the position-measuring device of this type, the reflector element is arranged as a roof prism having optical retroreflector functionality. Additional position-measuring devices having optical reflector elements developed as prism-type retroreflector elements are described, for example, in European Published Patent Application No. 0 387 520 and European Published Patent Application No. 1 347 271.

The reflector elements based on various prism variants, conventional for position-measuring devices, represent component parts that are relatively costly to manufacture. In addition, these component elements take up a great deal of space, and this results in an undesired enlargement of the scanning unit.

SUMMARY

Example embodiments of the present invention may provide a position-measuring device in which as compact a construction of the scanning unit as possible may be achieved.

According to example embodiments of the present invention, it is provided to arrange the elements in the scanning unit such that beams of rays impinging on the measuring graduation propagate diffracted in the direction of the scanning unit, where they pass through first grating structures. Subsequently, the partial beams of rays impinge on the reflector element, from which a back reflection takes place in the direction of the measuring graduation, before the partial beams of rays then pass through second grating structures and impinge again on the measuring graduation. The grating structures are arranged such that, upon the first and second passing through of the partial beams of rays, a defined lens effect on the partial beams of rays results.

Instead of complex and voluminously constructed retroreflector elements based on prisms, the scanning unit hereof provides a unit that includes one or more simple reflector elements and first and second grating structures having certain optical lens effects. The grating structures take over a retroreflector functionality in this connection, and also a scanning grating functionality. In this manner, a planar construction of this unit may be implemented which may make possible a simple and cost-effective assembly of same.

The grating structures and the at least one reflector element are able to be arranged on different elements such as, for example, a reflector plate and a scanning plate. In a similar manner, a compact monolithic construction is also possible, in which grating structures and the at least one reflector element are positioned on a single carrier substrate.

In response to passing through the first grating structures, there results, as the lens effect, a deflecting effect oriented antiparallel to the direction of incidence in the measuring direction, as well as a focusing effect perpendicular to the measuring direction, toward the reflector element. In response to the passage through the second grating structures, there results, as the lens effect, a deflecting effect in the measuring direction as well as at least one collimating effect perpendicular to the measuring direction.

The first and second grating structures may be arranged such that, because of the resulting deflecting effects during the first and the second passage, an error in alignment results between the points of impingement of the partial beams of rays on the first and second grating structures.

The first and second grating structures may be arranged as phase gratings, which suppress the 0th order of diffraction.

The first and second grating structures may be arranged as blazed phase gratings having a high efficiency in the in the +1st order of diffraction or the −1st order of diffraction.

In this connection, the first and second grating structures may, for example, have curved grating lines, which are arranged in an equidistant manner in the measuring direction.

The at least one reflector element may be arranged as a plane mirror reflector.

The plane mirror reflector may be arranged in the scanning unit, parallel to the measuring graduation.

The scanning unit may include a transparent carrier substrate, on whose side, facing the measuring graduation, the first and second grating structures are arranged. The at least one plane mirror reflector is arranged either on the side opposite to this of the carrier substrate, the reflecting side of the plane mirror reflector being oriented in the direction of the measuring graduation. Alternatively, the at least one plane mirror reflector is arranged either on the same side of the carrier substrate, the reflecting side of the plane mirror reflector being oriented in the direction facing away from the measuring graduation.

The first and second grating structures may be arranged such that a collimated partial beam of rays, impinging for the first time upon the measuring graduation, propagates in collimated fashion in the direction of the scanning unit after impinging upon the measuring graduation for the second time.

The various grating structures may have focal lengths that correspond to the optical distance between the grating structures and the reflector element.

The scanning unit may be arranged such that the beams of rays emitted by a light source impinge a first time upon a measuring graduation that is arranged as an incident-light diffraction grating, where there takes place a splitting into two partial beams of rays that are reflected back to the scanning unit and that correspond to two different orders of diffraction. In the scanning unit, the two reflected partial beams of rays pass through two first grating structures in the direction of two reflector elements, and in the process of doing that they experience a deflection effect that is oriented antiparallel to the direction of incidence, as well as only one focusing effect perpendicular to the measuring direction. The partial beams of rays deflected and focused in that manner then impinge upon the reflector elements and are reflected back in the direction of the measuring graduation. The two partial beams of rays that are reflected back then pass through two second grating structures in the direction of the measuring graduation, and, in this connection, they experience a deflection effect in the measuring direction, as well as only one collimating effect perpendicular to the measuring direction. Then the two partial beams of rays impinge again upon the measuring graduation, where a renewed diffraction and retroreflection of partial beams of rays in the direction of the scanning unit results.

The scanning unit may be arranged such that the beams of rays emitted by a light source impinge a first time upon a measuring graduation that is arranged as an incident-light diffraction grating, where there takes place a splitting into two partial beams of rays that are reflected back to the scanning unit and that correspond to two different orders of diffraction. In the scanning unit, the two reflected partial beams of rays pass through two first grating structures in the direction of two reflector elements, and in the process of doing that they experience a deflection effect that is oriented antiparallel to the direction of incidence, as well as a focusing effect both in the measuring direction and perpendicular to the measuring direction. The partial beams of rays deflected and focused in that manner then impinge upon the reflector elements and experience a retroreflection in the direction of the measuring graduation. The two partial beams of rays that are reflected back then pass through two second grating structures in the direction of the measuring graduation, and, in this connection, they experience a deflection effect in the measuring direction, as well as a collimating effect in the measuring direction and also perpendicular to the measuring direction. Then the two partial beams of rays impinge again upon the measuring graduation, where a renewed diffraction and retroreflection of partial beams of rays in the direction of the scanning unit results.

After the second retroreflection of partial beams of rays reflected back by the measuring graduation perpendicularly in the direction of the scanning unit, they may impinge superposed onto a splitting grating, where splitting into a plurality of spatial directions takes place, and the partial beams of rays split up into various spatial directions impinge upon a plurality of detectors of an optoelectronic detector system. At that location, in the case of relative motion of the scanning unit and the measuring graduation, there results in each case a scanning signal modulated as a function of the shifting.

It may be provided that, either between the reflector elements and the second grating structures, or between the second grating structures and the measuring graduation, polarizing optical elements are arranged in the beam path, through which the partial beams of rays pass after the retroreflection at the reflector element, and which transform the linearly polarized partial beams of rays into circularly polarized partial beams of rays.

Alternatively, in order to generate phase-shifted scanning signals, it may be provided that, either the average grating constants of the two first and the two second grating structures are selected to be only slightly different from the grating constant of the measuring graduation, or the grating lines of the two first and the two second grating structures are positioned at an angle deviating from 0° to the grating lines of the measuring graduation.

Furthermore, in the beam path of the position-measuring device, there may be provided an optically efficient window region which is passed through by the beams of rays emitted by the light source before the first incidence upon the measuring graduation, a deflecting grating being arranged in the optically efficient window region whose grating lines extend parallel to the measuring direction.

According to an example embodiment of the present invention, a position-measuring device for recording a relative position of a scanning unit and a measuring graduation movable with respect to the scanning unit in at least one measuring direction includes: a plurality of grating structures and at least one reflector element arranged on the scanning unit, elements in the scanning unit arranged such that beams of rays diffracted by the measuring graduation propagate in a direction of the scanning unit and pass through first grating structures, impinge subsequently onto the reflector element, from which a retroreflection occurs in a direction of the measuring graduation, then pass through second grating structures and then once again impinge upon the measuring graduation, the first grating structures and the second grating structures adapted to provide a defined lens effect on the partial beams of rays in response to each respective passing through of the partial beams of rays.

The first grating structures and the second grating structures may be configured such that: passing through the first grating structures provides, as the lens effect, a deflecting effect oriented antiparallel to a direction of incidence in the measuring direction and a focusing effect perpendicular to the measuring direction, toward the reflector element; and passing through the second grating structures provides, as the lens effect, a deflecting effect in the measuring direction and at least one collimating effect perpendicular to the measuring direction.

The first grating structures and the second grating structures may be configured such that, because of the resulting deflection effects during the first and second passing through, an offset results between points of impingement of the partial beams of rays upon the first grating structures and the second grating structures.

The first grating structures and the second grating structures may be arranged as phase gratings that suppress a 0th order of diffraction.

The first grating structures and the second grating structures may be arranged as blazed phase gratings having a high efficiency in at least one of (a) a +1st order of diffraction and (b) a −1st order of diffraction.

The first grating structures and the second grating structures may include curved grating lines arranged equidistantly in the measuring direction.

The reflector element may include a plane mirror reflector.

The plane mirror reflector may be arranged in the scanning unit parallel to the measuring graduation.

The scanning unit may include a transparent carrier substrate, the first grating structures and the second grating structures may be arranged on a side of the carrier substrate facing the measuring graduation, and the plane mirror reflector may be arranged one of (a) on a side of the carrier substrate opposite to the side facing the measuring graduation, a reflecting side of the plane mirror reflector oriented in the direction of the measuring graduation and (b) on a same side of the carrier substrate, the reflecting side of the plane mirror reflector oriented facing away from the measuring graduation.

The first grating structures and the second grating structures may be configured such that a collimated partial beams of rays impinging for the first time on the measuring graduation propagates after the second impinging on the measuring graduation collimated in the direction of the scanning unit.

The grating structures may have focal lengths that correspond to an optical distance between the grating structures and the reflector element.

The scanning unit may be configured such that the beams of rays emitted by a light source: impinge for a first time upon the measuring graduation arranged as an incident light diffraction grating, where a splitting occurs into two partial beams of rays reflected back to the scanning unit corresponding to two different orders of diffraction; in the scanning unit, the two retroreflected partial beams of rays pass through two first grating structures in a direction of two reflector elements and experience a deflection effect that is oriented antiparallel to the direction of incidence and only one focusing effect perpendicular to the measuring direction; the partial beams of rays deflected and focused impinge upon the reflector elements and experience a retroreflection in the direction of the measuring graduation; the two retroreflected partial beams of rays then pass through two second grating structures in the direction of the measuring graduation and experience a deflection effect in the measuring direction and only a collimating effect perpendicular to the measuring direction; and the two partial beams of rays then impinge again on the measuring graduation, where a renewed diffraction and retroreflection of the partial beams of rays results in the direction of the scanning unit.

The scanning unit may be configured such that the beams of rays emitted by a light source: impinge for a first time upon the measuring graduation arranged as an incident light diffraction grating, where a splitting occurs into two partial beams of rays reflected back to the scanning unit corresponding to two different orders of diffraction; in the scanning unit, the two retroreflected partial beams of rays pass through two first grating structures in the direction of two reflector elements and experience a deflection effect that is oriented antiparallel to the direction of incidence and a focusing effect in the measuring direction and perpendicular to the measuring direction; the partial beams of rays deflected and focused then impinge upon the reflector elements and experience a retroreflection in the direction of the measuring graduation; the two partial beams of rays that are reflected back then pass through two second grating structures in the direction of the measuring graduation and experience a deflection effect in the measuring direction and a collimating effect in the measuring direction and perpendicular to the measuring direction; then the two partial beams of rays impinge again upon the measuring graduation, where a renewed diffraction and retroreflection of partial beams of rays in the direction of the scanning unit results.

After the second retroreflection from the measuring graduation perpendicular in the direction of the scanning unit, retroreflected partial beams of rays may impinge superposed on a splitting grating, where splitting into a plurality of spatial directions occurs, and the partial beams of rays may be split into various spatial directions impinge upon a plurality of detectors of an optoelectronic detector system, where, for the relative motion of the scanning unit and the measuring graduation a scanning signal results that is modulated as a function of the movement.

One of (a) between the reflector elements and the second grating structures and (b) between the second grating structures and the measuring graduation polarization optical elements may be arranged in a beam path through which the partial beams of rays pass after the retroreflection at the reflector element and which are adapted to transform linearly polarized partial beams of rays into circularly polarized partial beams of rays.

One of (a) average grating constants of the two first grating structures and the two second grating structures may be slightly different from a grating constant of the measuring graduation and (b) grating lines of the two first grating structures and the two second grating structures may be arranged at an angle deviating from 0° from grating lines of the measuring graduation.

An optically efficient window region may be arranged in a beam path, the region may be passed through by the beams of rays emitted by the light source before the first impinging upon the measuring graduation, a deflection grating may be arranged in the optically efficient window region, and grating lines of the deflection grating may extend parallel to the measuring direction.

Additional details and aspects of example embodiments of the present invention are described in more detail below with reference to the appended Figures.

BRIEF DESCRIPTION OF THE DRAWINGS

FIG. 5 is a top view onto the reflector plate of the position-measuring device illustrated in FIGS. 1 to 4.

FIG. 9 is a top view onto the reflector plate of the position-measuring device illustrated in FIG. 7.

DETAILED DESCRIPTION

Figure 1:
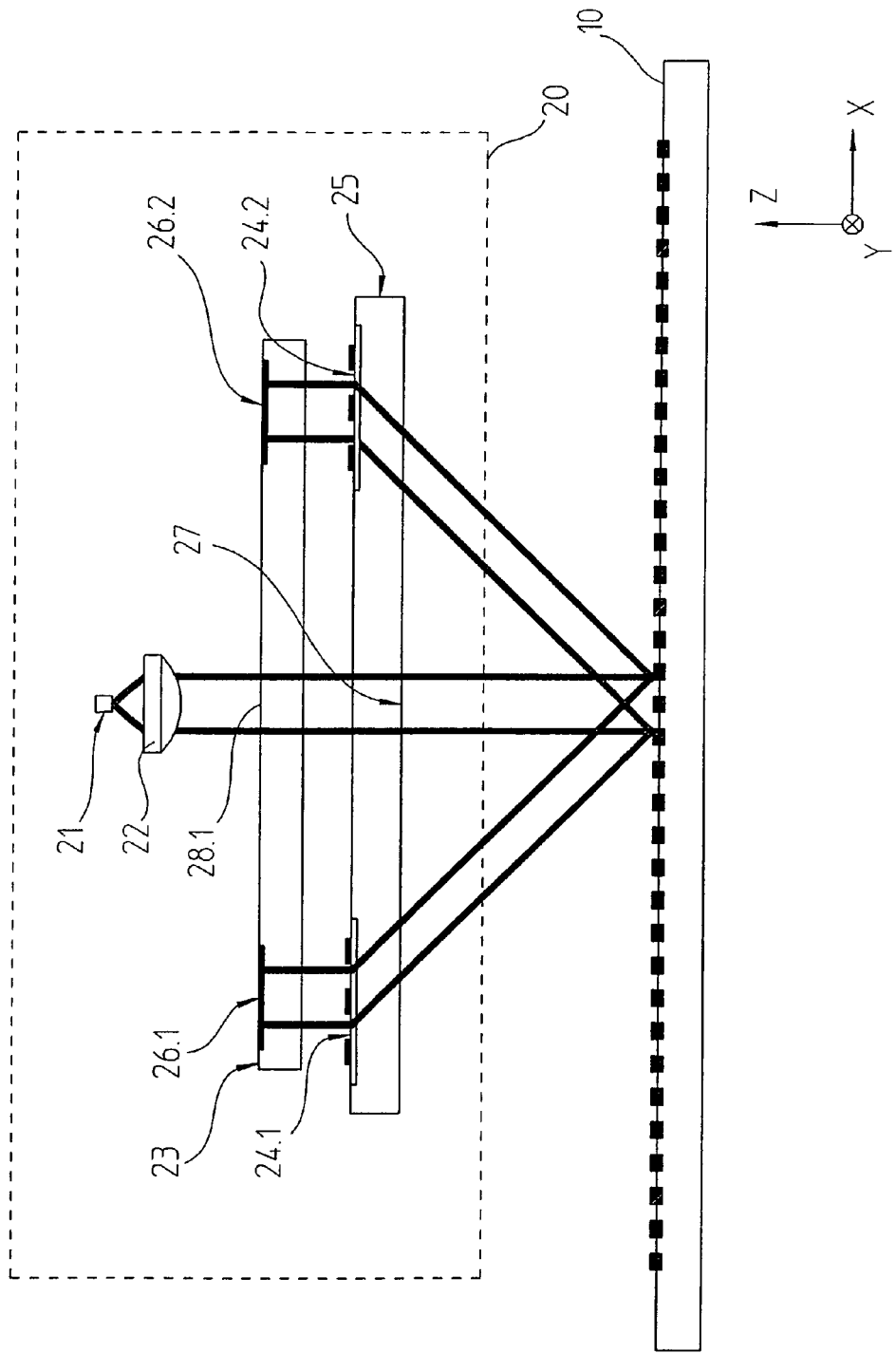
FIG. 1 illustrates a first part of the scanning beam path of a position-measuring device according to an example embodiment of the present invention.
Figure 2:
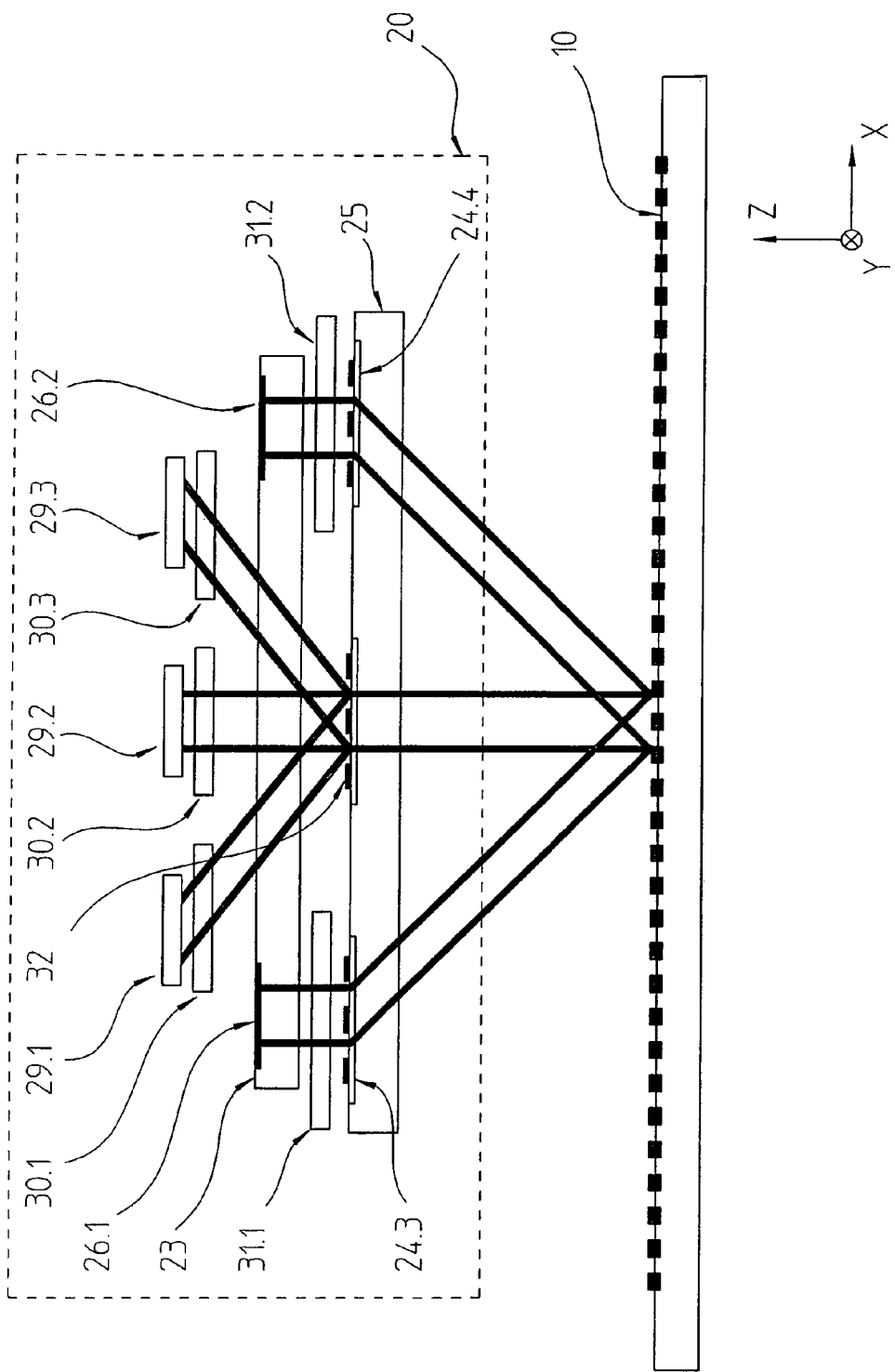
FIG. 2 illustrates a second part of the scanning beam path of the position-measuring device illustrated in FIG. 1.
Figure 3:
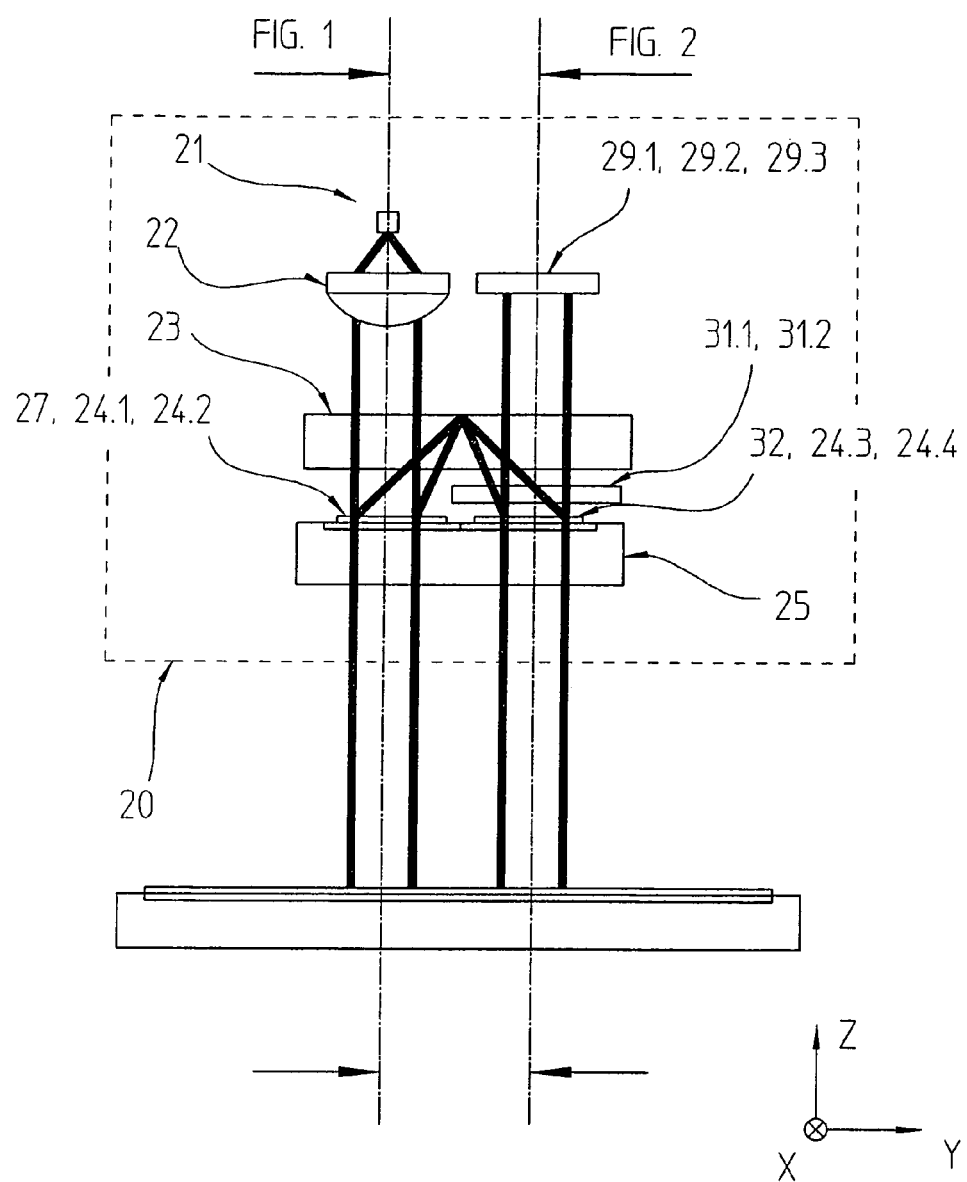
FIG. 3 is another view of the scanning beam path of the position-measuring device illustrated in FIGS. 1 and 2.
Figure 4:
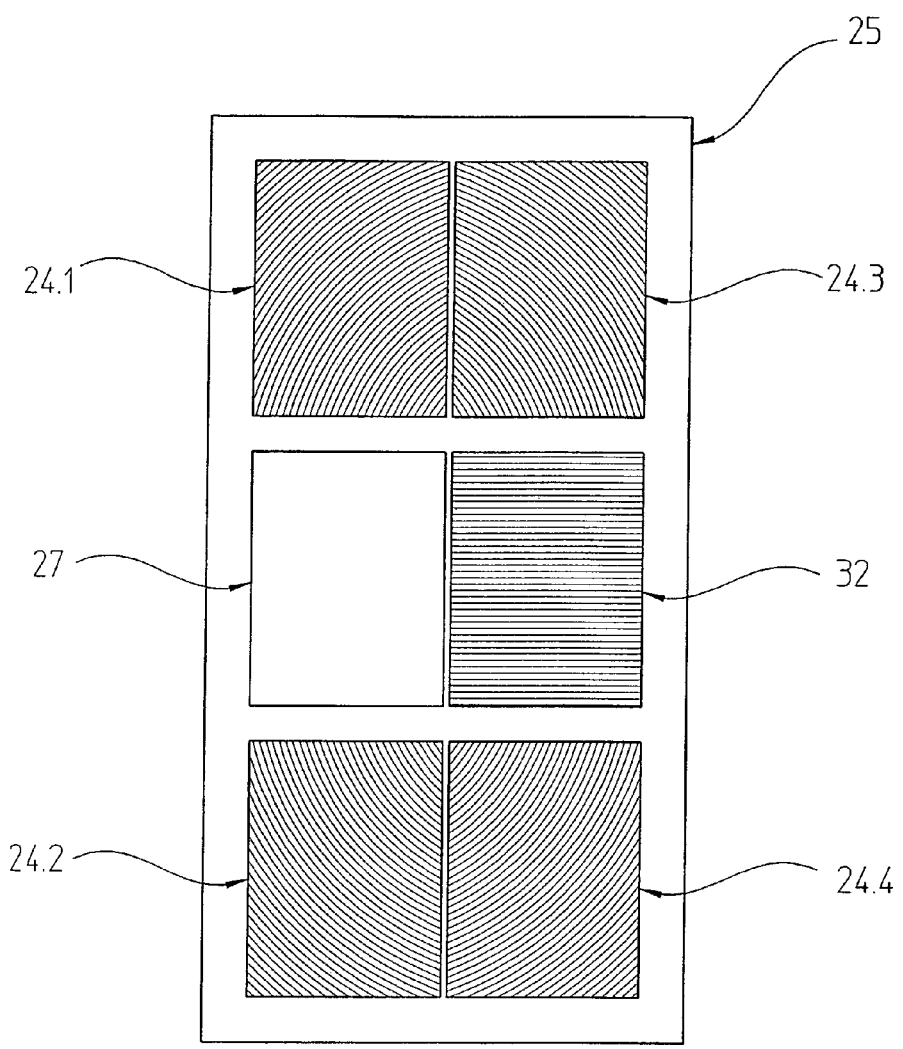
FIG. 4 is a top view onto the scanning plate of the position-measuring device illustrated in FIGS. 1 to 3.

Referring to FIGS. 1 to 5, a position-measuring device according to an example embodiment of the present invention is arranged as an incident light system. In this connection, FIGS. 1 and 2 each schematically illustrate partial scanning beam paths in a lateral view in the x-z plane, while FIG. 3 is a view of the scanning beam path in the y-z plane. In FIG. 1, the scanning beam-path is illustrated from-light source 21 to reflector elements 26.1 and 26.2, FIG. 2 illustrates the scanning beam path from reflector elements 26.1 and 26.2 to detector elements 29.1, 29.2, 29.3 of the optoelectronic detector system. FIGS. 4 and 5 respectively are top views onto scanning plate 25 or reflector plate 23 that have the optical elements provided there.

The position-measuring device includes a measuring graduation 10 and a scanning device 20 that is movable with respect to it in at least one measuring direction x. The objects, whose relative position is to be determined with the aid of the position-measuring device, are coupled, e.g., in a conventional manner, using measuring graduation 10 and scanning unit 20. In this connection, for example, machine parts may be involved, whose relative position has to be recorded in a precise manner. The scanning signals and the position data generated using the position-measuring device are processed further by a sequential electronics or evaluation unit, for example, for the control of the machine.

Such a position-measuring device may be for recording linear motions, using a measuring graduation that extends linearly. Rotary position-measuring devices may also be implemented, based on the considerations described herein.

Described below is the fundamental scanning beam path of the position-measuring device illustrated in FIGS. 1 to 5.

The linearly polarized beam of rays emitted by light source 21, for example, a laser diode, is collimated, in the example illustrated, first of all via a collimator lens 22, that is, converted to a parallel beam of rays. Thereafter, this beam of rays passes through optically inefficient window regions 28.1, 27 of a reflector plate 23 and a scanning plate 25. Reflector plate 23 and scanning plate 25 include, in this example, a plate-shaped, transparent carrier substrate, such as glass, on which a series of optical elements, such as reflector elements 26.1, 26.2 and grating structures 24.1, 24.4, 32 are arranged. The specific functions of the various optical elements in the scanning beam path are explained in greater detail below.

Subsequently, the collimated beam of rays impinges for the first time upon measuring graduation 10, which, in this example, is arranged as a linear incident light standard. Measuring graduation 10 includes a periodic arrangement of graduation regions having different optical properties that extend in measuring direction x. Measuring graduation 10 is a reflection diffraction grating, whose grating lines extend in the given y direction in the measuring graduation plane. In the following, in this connection, among other things, a so-called line direction y will also be mentioned.

In response to the impinging of the incident beam of rays upon measuring graduation 10, a splitting into two partial beams of rays takes place, which are reflected back as a +/-1st order of diffraction in the direction of scanning unit 20. In scanning unit 20, the partial beams of rays then pass through respective first grating structures 24.1, 24.2, which are arranged on scanning plate 25. First grating structures 24.1, 24.2 exert a specific optical lens effect on the partial beams of rays that are passing through. In this connection, on the one hand, a specific deflection effect on the partial beams of rays is involved, these being deflected antiparallel to the direction of incidence, in measuring direction x. On the other hand, a focusing effect on the partial beams of rays perpendicular to the measuring direction is involved, e.g., in the y direction or in the line direction of measuring graduation 10, toward the respectively postconnected reflector element 26.1, 26.2. In the representation of FIG. 3, for example, the last-named focusing effect in line direction y becomes clear. In FIG. 1, the first-named deflection effect with respect to the main propagation direction of the two partial beams of rays is illustrated.

In order to achieve such a lens effect of first grating structures 24.1, 24.2, first grating structures 24.1, 24.2 are arranged as so-called off-axis cylinder lenses on scanning plate 25. A defined lens effect may include a focusing and/or collimating optical effect upon the passing partial beams of rays. Their focal lengths correspond to the optical distance from reflector plate 23. Such an arrangement of the optical properties of first grating structures 24.1, 24.2 has the effect that the principal rays of the focusing partial beams of rays impinge in line direction y at a defined angle upon reflector plate 23, and thereby a spatial separation of the partial beams of rays that are incident on and emerging from reflector plate 23 results (see, e.g., FIG. 3).

A top view onto scanning plate 25 having first grating structures 24.1, 24.2 arranged on it is illustrated in FIG. 4. It is clear from this that these grating structures 24.1, 24.2 each have curved grating lines that are arranged equidistant in measuring direction x. First grating structures 24.1, 24.2 may be arranged as phase gratings which suppress the 0th order of diffraction. In this connection, so-called blazed phase gratings may be provided, which have a high efficiency in the +1st order of diffraction or in the −1st order of diffraction.

The partial beams of rays thus deflected and focused, subsequently reach reflector elements 26.1, 26.2, which, in the present example, are arranged on the upper side of reflector plate 23, and are arranged as plane mirror reflectors.

From reflector elements 26.1, 26.2 there takes place a retroreflection of the partial beams of rays in the direction of measuring graduation 10.

Before the partial beams of rays impinge for a second time upon measuring graduation 10, they pass through, in scanning unit 20, in the example illustrated, first of all respectively a polarization optical element 31.1, 31.2 in the form of a λ/4 plate and subsequently second grating structures 24.3, 24.4, which are also arranged on scanning plate 25 (see, e.g., FIG. 3).

From the linearly polarized partial beams of rays, in each case opposite circularly polarized partial beams of rays are generated, via polarization optical elements 31.1, 31.2. Second grating structures 24.3, 24.4 also have a defined lens effect on the partial beams of rays passing through. Thus, the circularly polarized partial beams of rays experience in this connection a deflection effect in measuring direction x, that is, in line direction y. Second grating structures 24.3, 24.4 may be arranged as so-called off-axis lenses. With reference to the arrangement of these, reference is made to the discussion of first grating structures 24.1, 24.2.

Based on the resulting deflection effects explained, during the first and second passing through grating structures 24.1-24.4, there is an error in alignment of rays between the first and the second points of impingement of the partial beams of rays on first and second grating structures 24.1 to 24.4.

The partial beams of rays that are thus deflected and (partially) collimated at least in the y direction by second grating structures 24.3, 24.4 subsequently arrive for a second time on measuring graduation 10, where a renewed diffraction and retroreflection of the partial beams of rays in the form of the +/−1st order of diffraction in the direction of scanning unit 20 result. After reflection at measuring graduation 10, the partial beams of rays, that are reflected back perpendicularly in the direction of scanning unit 20, are incident as superposed, now once again linearly polarized beams of rays, on a splitting grating 32, which is arranged on scanning plate 25. The direction of polarization of the beam of rays impinging upon splitting grating 32 depends on the relative position of measuring graduation 10 with respect to scanning unit 20. If, for example, measuring graduation 10 is shifted by one-quarter of its grating constants in measuring direction x, there comes about a phase shift of 360° between the partial beams of rays that have been brought to superposition, and this is based on the two-time diffraction at measuring graduation 10 into the +/−1st order of diffraction. The direction of polarization of the resulting linearly polarized beam of rays changes by 180°, which corresponds to one signal period in the resulting scanning signal.

Splitting grating 32 in the present example has a periodic graduation structure in measuring direction x, whose graduation lines extend in the y direction. As illustrated, at splitting grating 32 a splitting takes place of the incident beam of rays into three different spatial directions. Detector elements 29.1 to 29.3 of an optoelectronic detector system are respectively placed in the different spatial directions, upon which the split-up beams of rays impinge after passing through optically inefficient window regions 28.2 on reflector plate 23. For a relative motion of measuring graduation 10 and scanning unit 20, at detector elements 29.1 to 29.3, there result the scanning signals, that are modulated as a function of the shifting, which are able to be processed further, e.g., in a conventional manner. In each case, in front of detector elements 29.1 to 29.3, an additional polarization optical element 30.1 to 30.3 in the form of a polarizer is arranged, in order to generate in this manner three scanning signals phase shifted by +/−120°.

Instead of complex prisms for implementing the deflection functionality and the scanning grating functionality in the scanning beam path in the scanning unit, one (e.g., diffractive) grating structure in the form of the first and second grating structures may be used in conjunction with a simple plane mirror reflector.

The exemplary embodiment described above may be transformed or supplemented. A few alternatives are briefly explained below.

Thus, it is also possible to position polarization optical elements 31.1, 31.2, which effect the transformation of the linearly polarized partial beams of rays into oppositely circularly polarized partial beams of rays, not between reflector elements 26.1, 26.2 and second grating structures 24.3, 24.4, but only in the subsequent beam path, between second grating structures 24.3, 24.4 and measuring graduation 10.

Furthermore, reflector elements 26.1, 26.2 may also be arranged on the lower side of reflector plate 23.

Instead of the explained polarization optical arrangement for generating the phase shifted scanning signals, an alternative generation of same may also be provided. For this, so-called Vernier scanning principles or Moiré scanning principles come into consideration, in which, then, the grating constants of the measuring graduation and of the first and second grating structures are to be selected to be slightly different (Vernier system) or having a slightly different angular alignment (Moiré system). A periodic fringe pattern then comes about in the detection plane which is modulated as a function of the shifting and may be scanned, e.g., in a conventional manner.

In such an arrangement, all polarization optical component parts of the explained exemplary embodiment may be omitted, that is, the above-mentioned λ/4 plates 31.1, 31.2, polarizers 30.1, 30.2, 30.3 as well as splitting grating 32. In such an arrangement, for example, a so-called structured detector device may be placed in the detection plane, via which scanning takes place of the fringe pattern resulting there, and a conversion of same to phase shifted scanning signals. Alternatively to such a detection variant, in this arrangement, e.g., in a conventional manner, optical component parts such as cylinder lens arrays or grating structures in conjunction with planar detectors may also be used for scanning the fringe pattern.

In a modification, it may be provided in the scanning unit, instead of the separate scanning plate and reflector plate, to select a monolithic construction in which only a single transparent carrier substrate is provided, on which both the various grating structures and the reflector elements are arranged. Corresponding exemplary embodiments are illustrated schematically in FIGS. 6a and 6b.

Figure 6A:
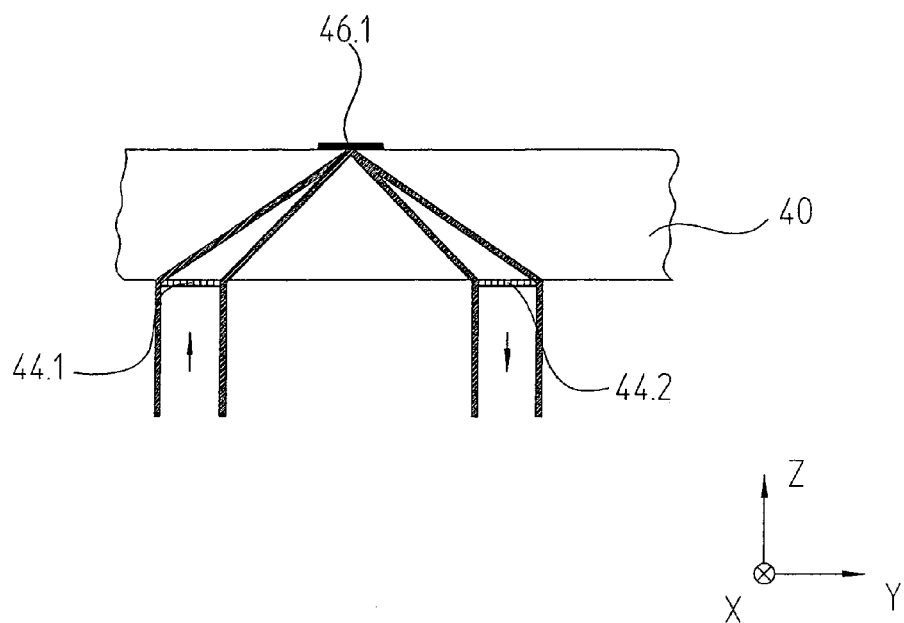
FIGS. 6a and 6b illustrate alternative arrangements of the reflector element and the grating structures in the scanning unit of the position-measuring device illustrated in FIGS. 1 to 5.

In the example embodiment illustrated in FIG. 6a, a partial view of a corresponding component part is illustrated in the y-z plane in the scanning beam path, analogously to the previous representation in FIG. 3. Instead of separate elements for a scanning plate and a reflector plate, at this point a single transparent carrier substrate 40 is provided, on whose lower side, or rather the side facing the measuring graduation, first and second grating structures 44.1, 44.2 are arranged. On the opposite side or upper side of carrier substrate 40, reflector element 46.1 is arranged, in turn developed as a simple plane mirror reflector.

Figure 6B:
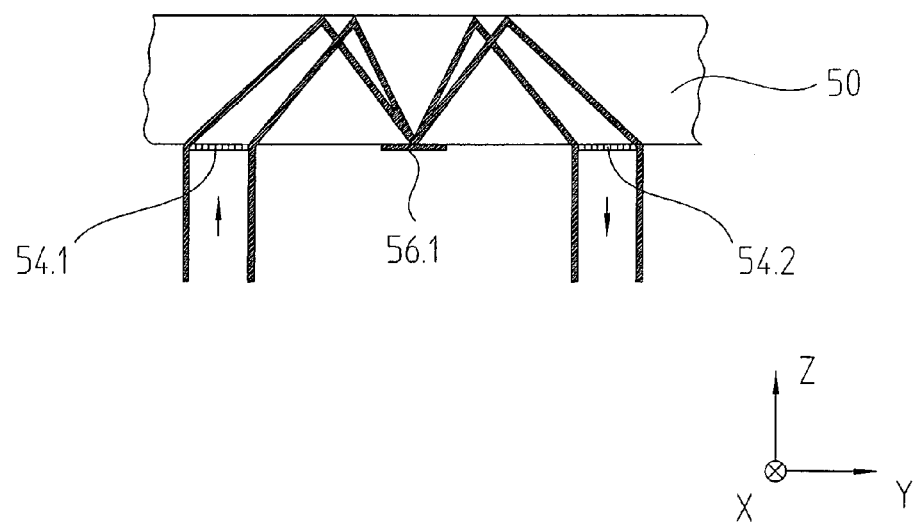

FIG. 6b illustrates a similar variant of a monolithic construction. Again, only a single transparent carrier substrate 50 is provided, in which the optically relevant elements are arranged, in the form of first and second grating structures 54.1, 54.2 and reflector element 56.1, at this point all of them on the lower side of the carrier substrate. The required deflection of the partial beams of rays at the opposite upper side of carrier substrate 50 may take place, for example, via additional reflector elements placed there or reflecting layers.

In a monolithic construction illustrated in FIG. 6a or FIG. 6b, the application of reflecting layers may be completely omitted if the beam tilts in carrier substrate 50 are large enough, based on correspondingly fine grating structures 44.1, 44.2, 54.1, 54.2, so that in that manner total reflection occurs. In this connection, finer grating structures 44.1, 44.2, 54.1, 54.2 may provide that fewer orders of diffraction are created, and thereby more optical power remains in the desired order of diffraction.

The light source does not necessarily have to be integrated into the scanning unit as discussed in the above example. Thus, for example, it is also possible to position the light source at a distance from it, and to supply the illuminating beams of rays of the scanning unit using light conductors.

The same applies also for the detector elements of the optoelectronic detector system, that is, these may also be arranged spatially separated from the actual scanning unit. The partial beams of rays that are to be detected are then supplied to the detector elements, for example, via light conductors.

Figure 7:
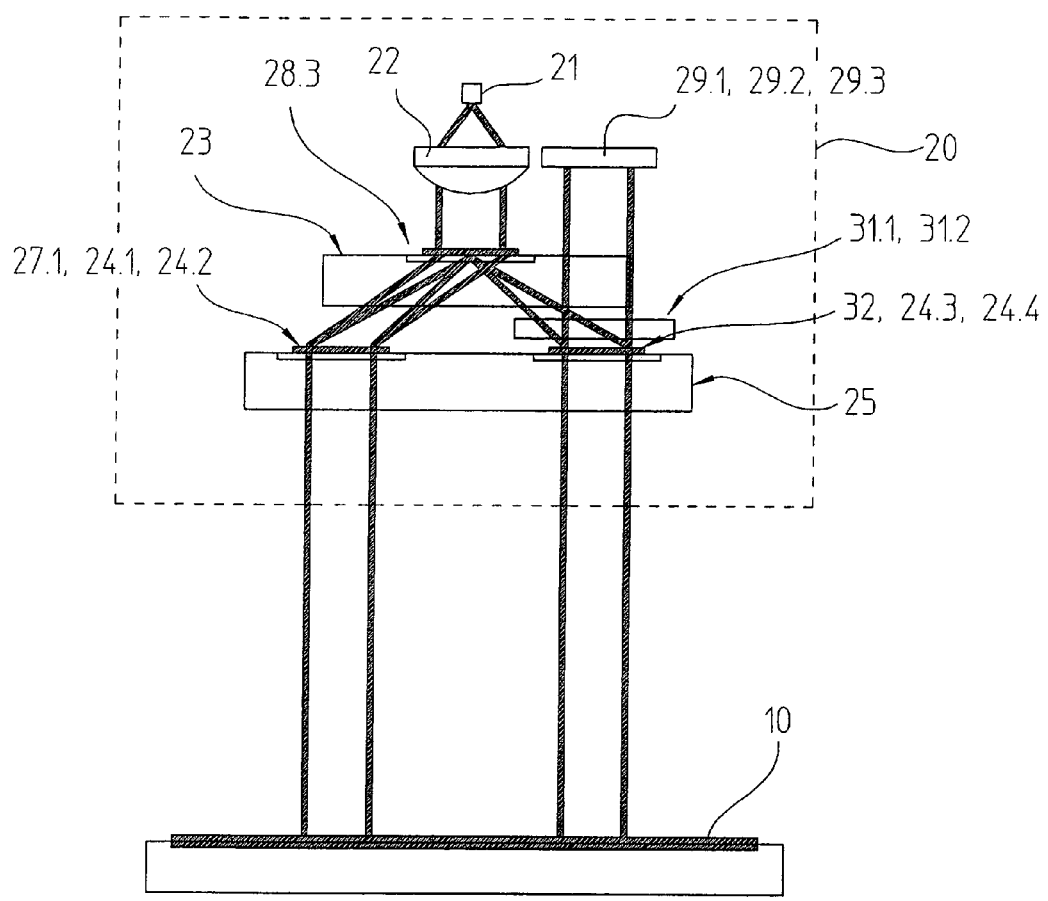
FIG. 7 illustrates an alternative scanning beam path of the position-measuring device illustrated in FIGS. 1 to 5.
Figure 8:
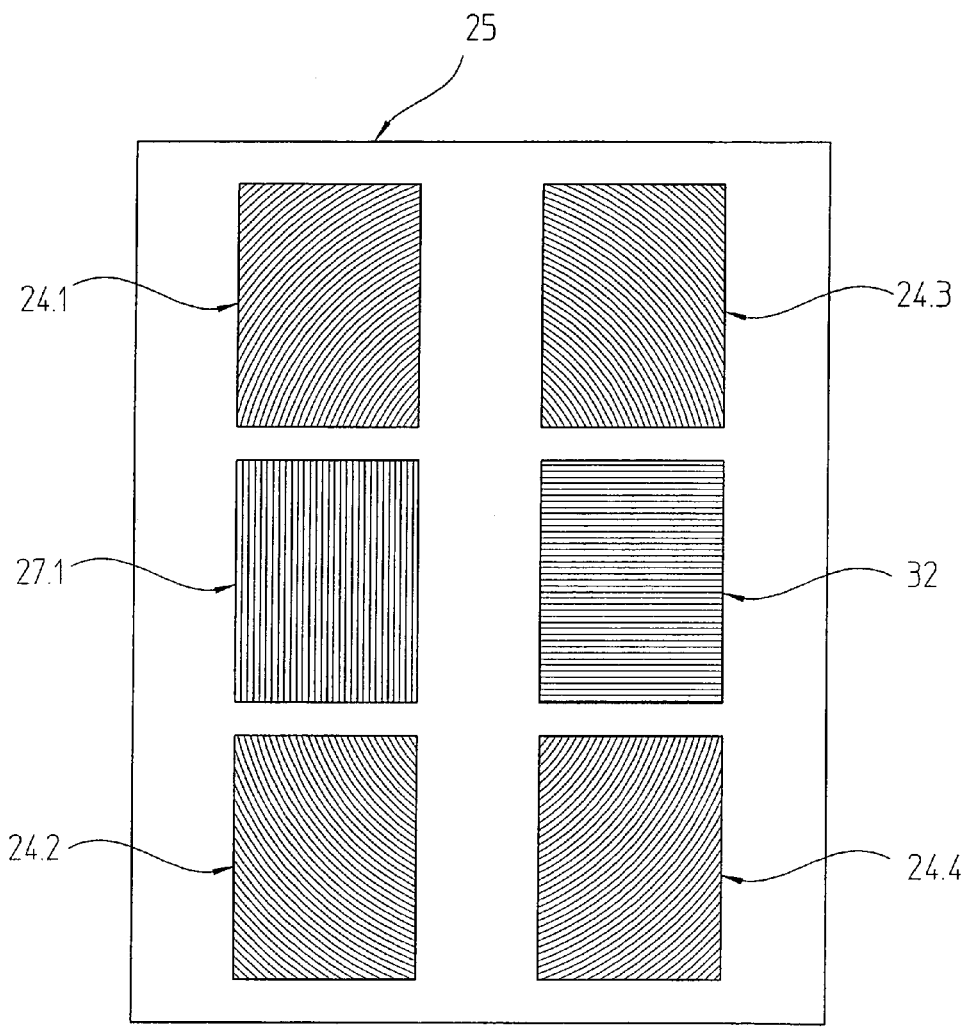
FIG. 8 is a top view onto the scanning plate of the position-measuring device illustrated in FIG. 7.

A further modification of the example embodiment described above is illustrated schematically in FIGS. 7 to 9. Functionally similar components of this exemplary embodiment are designated here using identical reference numerals as in the example explained above. In the following, only the differences from the example explained above are described, and otherwise reference is made to the previous comments.

Thus, in this variant it is provided that deflection gratings 27.1, 28.3 are respectively arranged in window regions 27, 28.1, 28.2, of scanning plate and reflector plate 25, 23, that were optically inefficient in the beam path in the previous example. Deflection gratings 27.1, 28.3 each have graduation lines that are periodically arranged in the y direction and that extend in measuring direction x. The periodicities of the two deflection gratings 27.1, 28.3 in the now optically efficient window regions are selected to be identical.

The provision of such deflection gratings 27.1, 28.3 in the corresponding window regions of scanning plate and reflector plate (25, 23) in the beam path has the effect that possible wavelength changes of the light source are able to be compensated for. Based on diffractively developed first and second grating structures 24.1 to 24.4, otherwise possible wavelength changes may cause an undesired shift in the beam's error in alignment in the y direction, if the first and second points of impingement in the first and second grating structures are shifted, which may virtually mean a shift in the actual measuring point. The positioning of deflection gratings 27.1, 28.3, as provided, has the result that possible wavelength changes have an oppositely directed effect on the first and second points of impingement, and thereby the actual beam's error in alignment, or rather, the actual measuring point, remain unchanged.

The various alternative arrangements described above may also be implemented in conjunction with this variant.

Figure 10:
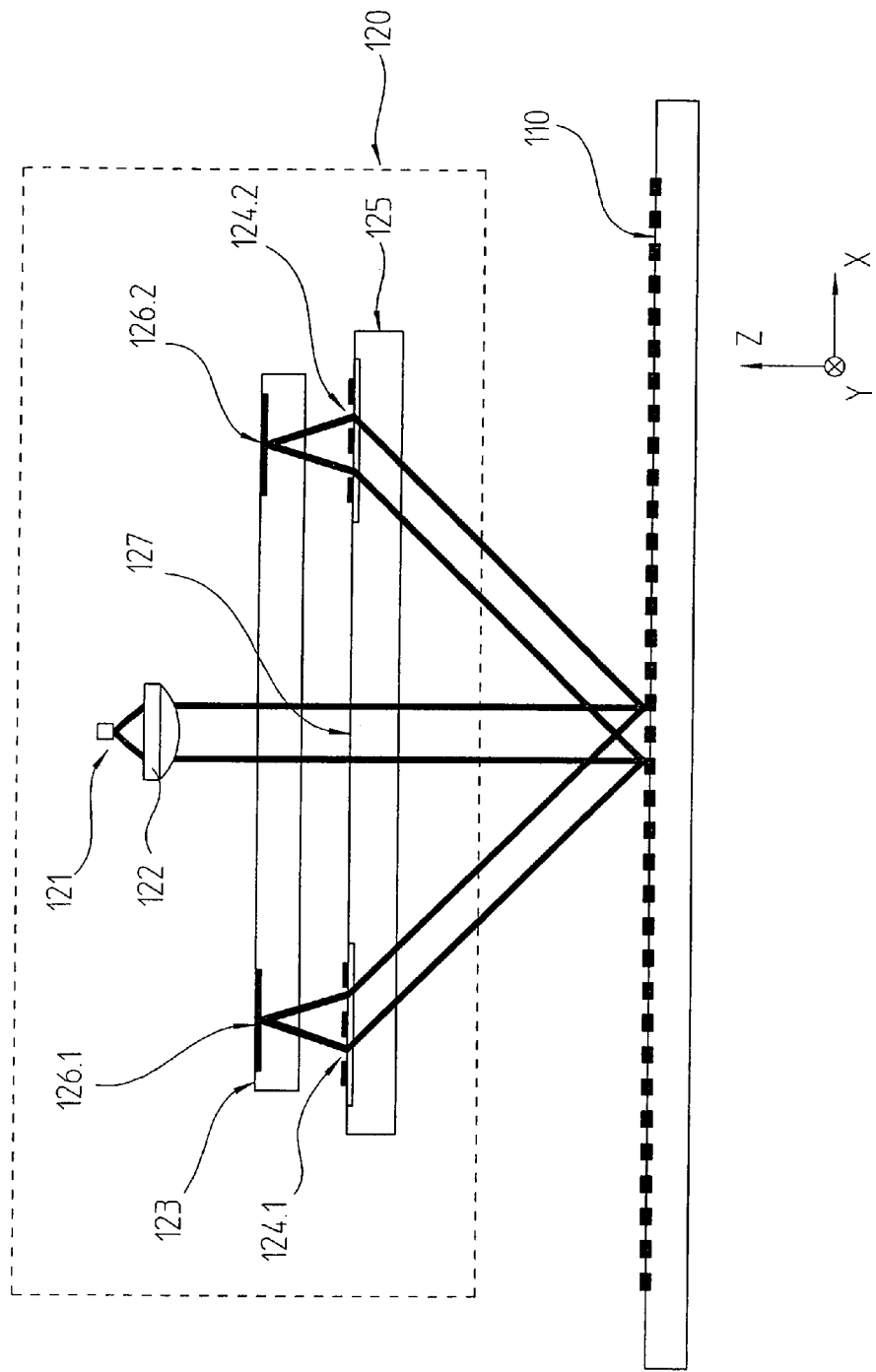
FIG. 10 illustrates a first part of the scanning beam path of a position-measuring device according to an example embodiment of the present invention.
Figure 11:
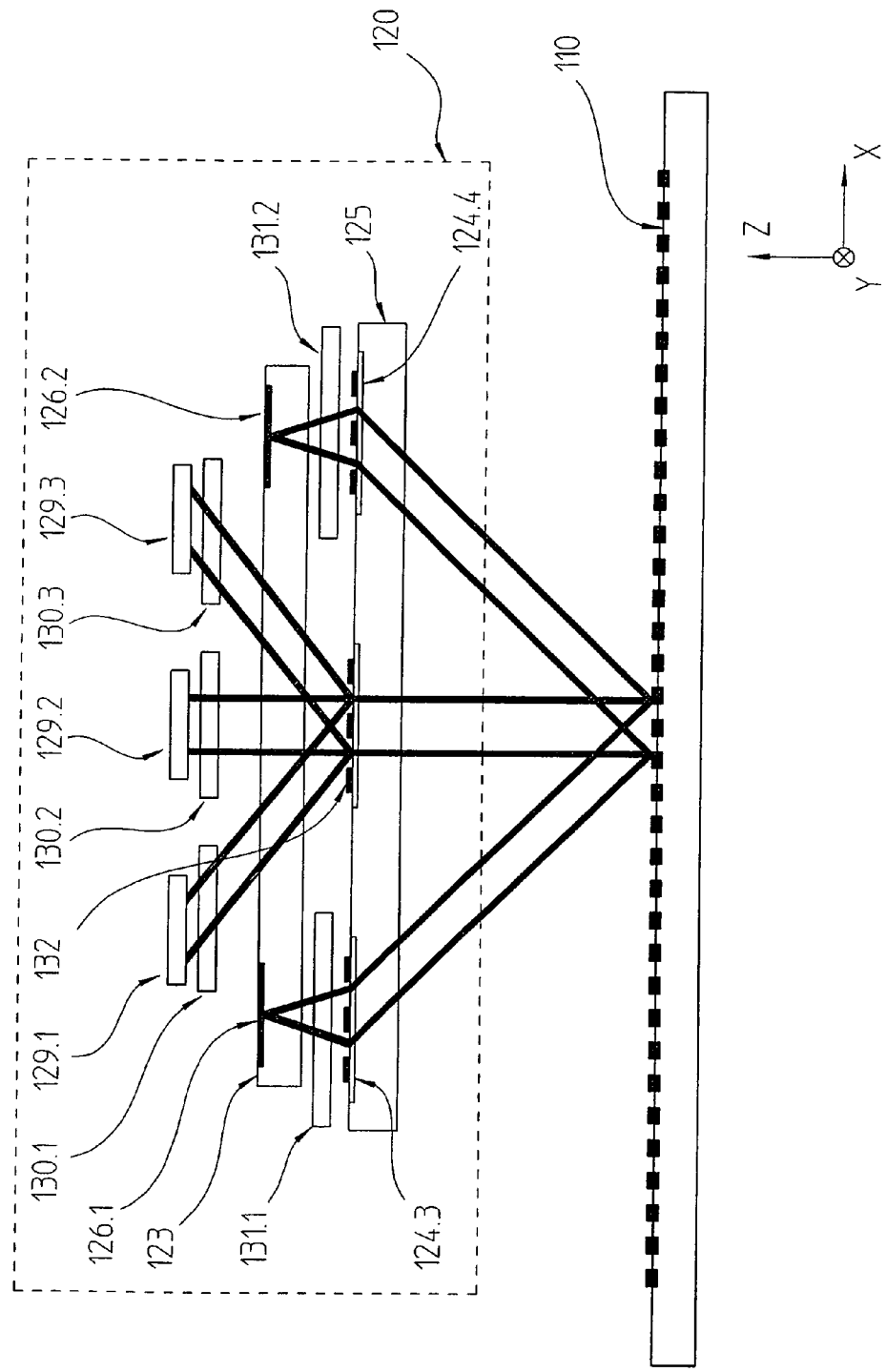
FIG. 11 illustrates a second part of the scanning beam path of the position-measuring device illustrated in FIG. 10.
Figure 12:
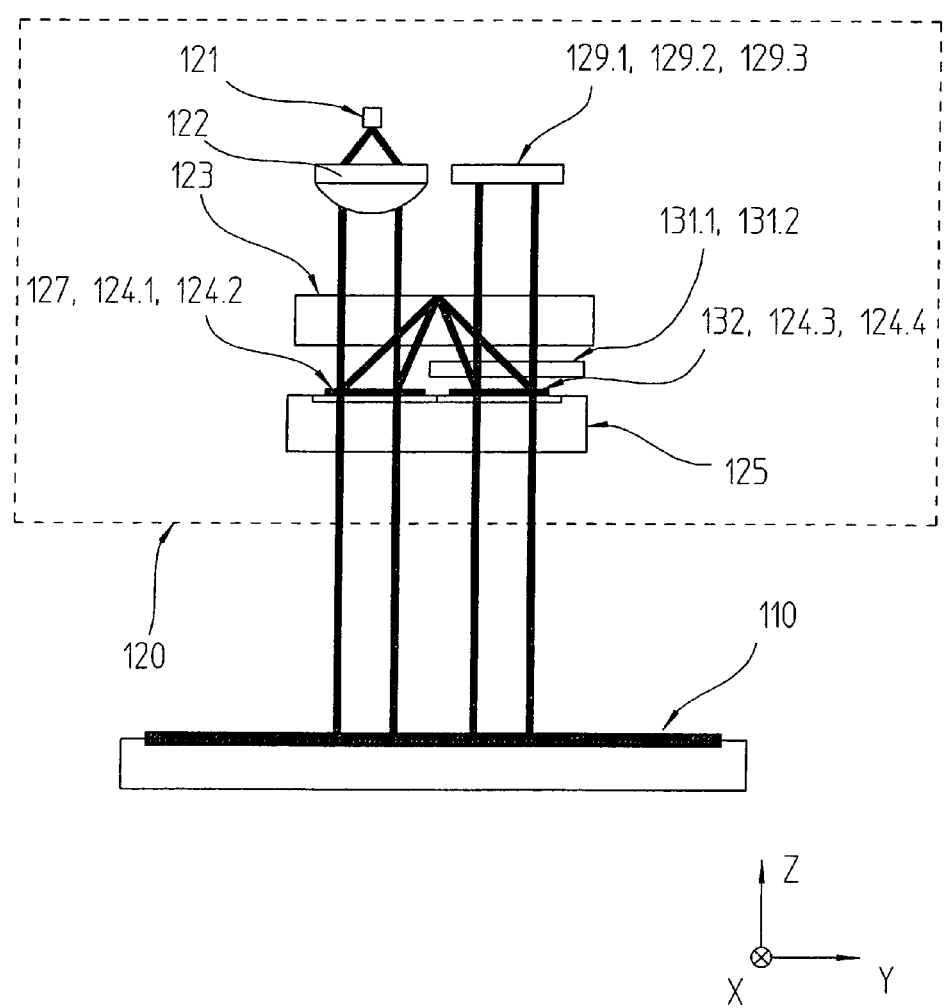
FIG. 12 is another view of the scanning beam path of the position-measuring device illustrated in FIGS. 10 and 11.

A position-measuring device according to an example embodiment of the present invention is described below with reference to FIGS. 10 to 12. The basic construction of this example embodiment, as well as the course of the scanning beam path is substantially identical to the first explained example embodiment. In the following, therefore, the differences are explained in more detail.

Thus, first grating structures 124.1, 124.2 have as a lens effect, in addition to the optical functionality according to the first example embodiment illustrated in FIGS. 1 to 5, an additional focusing effect on the partial beams of rays passing through in measuring direction x. This is illustrated in FIG. 10. The first grating structures are formed for this purpose as appropriately dimensioned off-axis lenses, whose focal lengths correspond to the optical distance from reflector plate 123. Such a layout of the optical properties of first grating structures 124.1, 124.2 has the effect that the main beam of the focused partial beam of rays in measuring direction x impinges perpendicularly on reflector plate 123, but in line direction y, on the other hand, at a specified angle. This angle is selected such that a spatial separation results of the partial beams of rays incident on and emerging from reflector plate 123 in the y direction. In response to the passing through second grating structures 124.3, 124.4 taking place after the reflection at reflector elements 126.1, 126.2, the partial beams of rays again experience an optical lens effect, as explained in the above example, that is, there takes place a deflection antiparallel to the direction of incidence, as well as a collimation of same.

First grating structures 124.1, 124.2, that are arranged in this example embodiment as off-axis lenses, focus the respective partial beams of rays in both lateral directions x, y, and thereby correspond in their optical lens effect to usual cylindrically symmetrical lenses. By contrast to this, the off-axis cylinder lenses of the first example embodiment only have a lens effect in the form of a focusing effect in the y direction.

For the correct functioning of this example embodiment, it is provided, in addition, that reflector plate 123 is arranged as parallel as possible to reflector element.

Accordingly, via the additional effect of the first grating structures, an optical retroreflector functionality results from the collaboration of grating structures 124.1 to 124.4 and reflector elements 126.1, 126.2 in the scanning beam path. Instead of implementing such a retroreflector functionality, as was done using costly triple prisms, etc., the same optical effect may be achieved by diffractive elements that are, e.g., clearly constructed in a simpler manner.

Apart from that, in this exemplary embodiment, all the alternative measures that are explained above may be implemented, that is, for this exemplary embodiment, diverse variants are also possible.

Alternatively to the incident light position-measuring device explained above, it is also possible to arrange transmitted light position-measuring devices. Thus, for example, the scanning side system of first grating structures, a reflector plate and second grating structures may also be used to deflect the partial beams of rays, coming from the transmitted light measuring graduation, after their first passing through it, back to the transmitted light measuring graduation, etc. The respective scanning unit may then enclose the measuring graduation, e.g., in a conventional manner, in a wraparound manner.

What is claimed is:

1. A position-measuring device for recording a relative position of a scanning unit and a measuring graduation movable with respect to the scanning unit in at least one measuring direction, comprising:
    a plurality of grating structures and at least one reflector element arranged on the scanning unit, elements in the scanning unit arranged such that beams of rays diffracted by the measuring graduation propagate in a direction of the scanning unit and pass through first grating structures, impinge subsequently onto the reflector element, from which a retroreflection occurs in a direction of the measuring graduation, then pass through second grating structures and then once again impinge upon the measuring graduation, the first grating structures and the second grating structures adapted to provide a defined lens effect on the partial beams of rays in response to each respective passing through of the partial beams of rays.

2. The position-measuring device according to claim 1, wherein the first grating structures and the second grating structures are configured such that:
    passing through the first grating structures provides, as the lens effect, a deflecting effect oriented antiparallel to a direction of incidence in the measuring direction and a focusing effect perpendicular to the measuring direction, toward the reflector element; and
    passing through the second grating structures provides, as the lens effect, a deflecting effect in the measuring direction and at least one collimating effect perpendicular to the measuring direction.

3. The position-measuring device according to claim 2, wherein the first grating structures and the second grating structures are configured such that, because of the resulting deflection effects during the first and second passing through, an offset results between points of impingement of the partial beams of rays upon the first grating structures and the second grating structures.

4. The position-measuring device according to claim 1, wherein the first grating structures and the second grating structures are arranged as phase gratings that suppress a 0th order of diffraction.

5. The position-measuring device according to claim 4, wherein the first grating structures and the second grating structures are arranged as blazed phase gratings having a high efficiency in at least one of (a) a +1st order of diffraction and (b) a −1st order of diffraction.

6. The position-measuring device according to claim 1, wherein the first grating structures and the second grating structures include curved grating lines arranged equidistantly in the measuring direction.

7. The position-measuring device according to claim 1, wherein the reflector element includes a plane mirror reflector.

8. The position-measuring device according to claim 7, wherein the plane mirror reflector is arranged in the scanning unit parallel to the measuring graduation.

9. The position-measuring device according to claim 7, wherein the scanning unit includes a transparent carrier substrate, the first grating structures and the second grating structures arranged on a side of the carrier substrate facing the measuring graduation, the plane mirror reflector arranged one of (a) on a side of the carrier substrate opposite to the side facing the measuring graduation, a reflecting side of the plane mirror reflector oriented in the direction of the measuring graduation and (b) on a same side of the carrier substrate, the reflecting side of the plane mirror reflector oriented facing away from the measuring graduation.

10. The position-measuring device according to claim 1, wherein the first grating structures and the second grating structures are configured such that a collimated partial beams of rays impinging for the first time on the measuring graduation propagates after the second impinging on the measuring graduation collimated in the direction of the scanning unit.

11. The position-measuring device according to claim 1, wherein the grating structures have focal lengths that correspond to an optical distance between the grating structures and the reflector element.

12. The position-measuring device according to claim 2, wherein the scanning unit is configured such that the beams of rays emitted by a light source:
  impinge for a first time upon the measuring graduation arranged as an incident light diffraction grating, where a splitting occurs into two partial beams of rays reflected back to the scanning unit corresponding to two different orders of diffraction;
  in the scanning unit, the two retroreflected partial beams of rays pass through two first grating structures in a direction of two reflector elements and experience a deflection effect that is oriented antiparallel to the direction of incidence and only one focusing effect perpendicular to the measuring direction;
  the partial beams of rays deflected and focused impinge upon the reflector elements and experience a retroreflection in the direction of the measuring graduation;
  the two retroreflected partial beams of rays then pass through two second grating structures in the direction of the measuring graduation and experience a deflection effect in the measuring direction and only a collimating effect perpendicular to the measuring direction; and
  the two partial beams of rays then impinge again on the measuring graduation, where a renewed diffraction and retroreflection of the partial beams of rays results in the direction of the scanning unit.

13. The position-measuring device according to claim 2, wherein the scanning unit is configured such that the beams of rays emitted by a light source:
  impinge for a first time upon the measuring graduation arranged as an incident light diffraction grating, where a splitting occurs into two partial beams of rays reflected back to the scanning unit corresponding to two different orders of diffraction;
  in the scanning unit, the two retroreflected partial beams of rays pass through two first grating structures in the direction of two reflector elements and experience a deflection effect that is oriented antiparallel to the direction of incidence and a focusing effect in the measuring direction and perpendicular to the measuring direction;
  the partial beams of rays deflected and focused then impinge upon the reflector elements and experience a retroreflection in the direction of the measuring graduation;
  the two partial beams of rays that are reflected back then pass through two second grating structures in the direction of the measuring graduation and experience a deflection effect in the measuring direction and a collimating effect in the measuring direction and perpendicular to the measuring direction;
  then the two partial beams of rays impinge again upon the measuring graduation, where a renewed diffraction and retroreflection of partial beams of rays in the direction of the scanning unit results.

14. The position-measuring device according to claim 12, wherein, after the second retroreflection from the measuring graduation perpendicular in the direction of the scanning unit, retroreflected partial beams of rays impinge superposed on a splitting grating, where splitting into a plurality of spatial directions occurs, and the partial beams of rays split into various spatial directions impinge upon a plurality of a detectors of an optoelectronic detector system, where, for the relative motion of the scanning unit and the measuring graduation a scanning signal results that is modulated as a function of the movement.

15. The position-measuring device according to claim 14, wherein one of (a) between the reflector elements and the second grating structures and (b) between the second grating structures and the measuring graduation polarization optical elements are arranged in a beam path through which the partial beams of rays pass after the retroreflection at the reflector element and which are adapted to transform linearly polarized partial beams of rays into circularly polarized partial beams of rays.

16. The position-measuring device according to claim 12, wherein one of (a) average grating constants of the two first grating structures and the two second grating structures are slightly different from a grating constant of the measuring graduation and (b) grating lines of the two first grating structures and the two second grating structures are arranged at an angle deviating from 0° from grating lines of the measuring graduation.

17. The position-measuring device according to claim 12, wherein an optically efficient window region is arranged in a beam path, the region passed through by the beams of rays emitted by the light source before the first impinging upon the measuring graduation, a deflection grating arranged in the optically efficient window region, grating lines of the deflection grating extending parallel to the measuring direction.

18. The position-measuring device according to claim 13, wherein, after the second retroreflection from the measuring graduation perpendicular in the direction of the scanning unit, retroreflected partial beams of rays impinge superposed on a splitting grating, where splitting into a plurality of spatial directions occurs, and the partial beams of rays split into various spatial directions impinge upon a plurality of detectors of an optoelectronic detector system, where, for the relative motion of the scanning unit and the measuring graduation a scanning signal results that is modulated as a function of the movement.

19. The position-measuring device according to claim 18, wherein one of (a) between the reflector elements and the second grating structures and (b) between the second grating structures and the measuring graduation polarization optical elements are arranged in a beam path through which the partial beams of rays pass after the retroreflection at the reflector element and which are adapted to transform linearly polarized partial beams of rays into circularly polarized partial beams of rays.

20. The position-measuring device according to claim 13, wherein one of (a) average grating constants of the two first grating structures and the two second grating structures are slightly different from a grating constant of the measuring graduation and (b) grating lines of the two first grating structures and the two second grating structures are arranged at an angle deviating from 0° from grating lines of the measuring graduation.

21. The position-measuring device according to claim 13, wherein an optically efficient window region is arranged in a beam path, the region passed through by the beams of rays emitted by the light source before the first impinging upon the measuring graduation, a deflection grating arranged in the optically efficient window region, grating lines of the deflection grating extending parallel to the measuring direction.

* * * * *